Dec. 20, 1927.
W. R. ROUPRICH
INDICATOR BOARD
Filed May 24, 1926
1,653,312
2 Sheets-Sheet 1
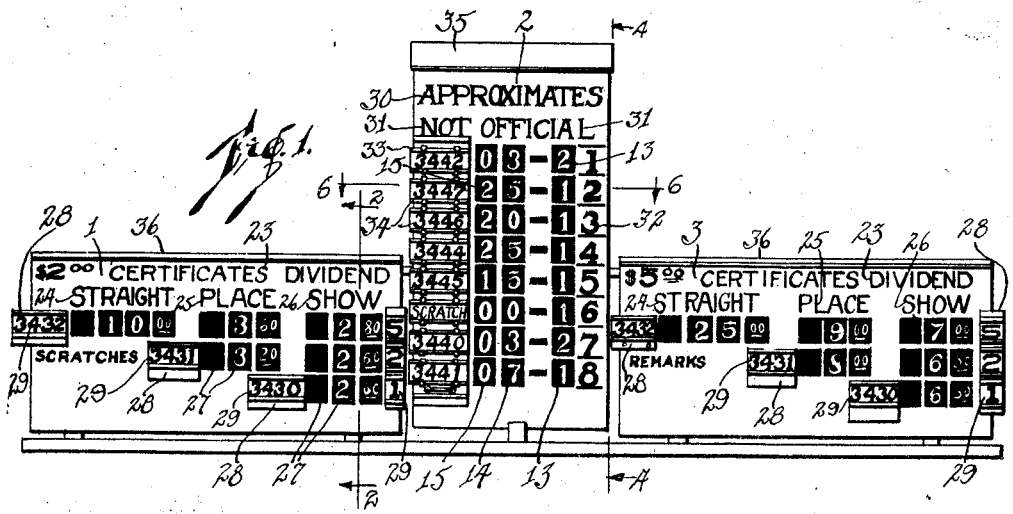
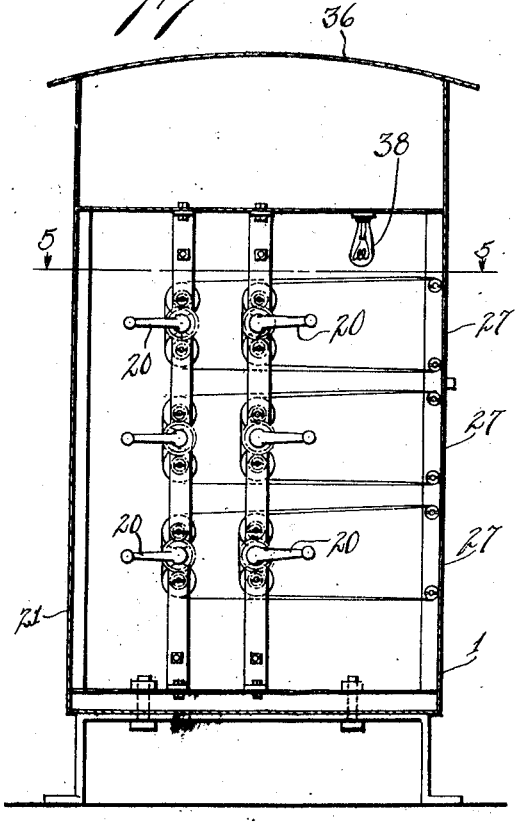
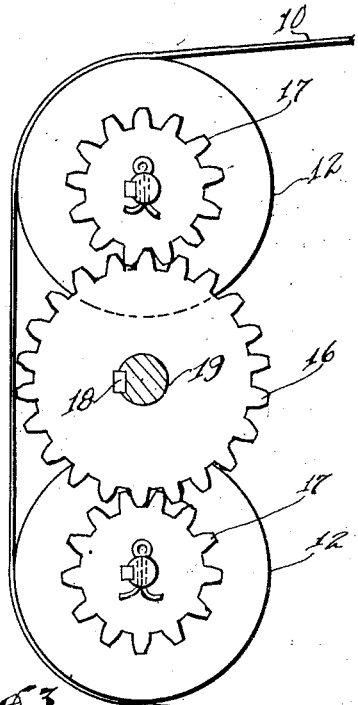
INVENTOR
W. R. Rouprich
BY
ATTORNEYS Dec. 20, 1927.   1,653,312
W. R. ROUPRICH
INDICATOR BOARD
Filed May 24, 1926    2 Sheets-Sheet 2
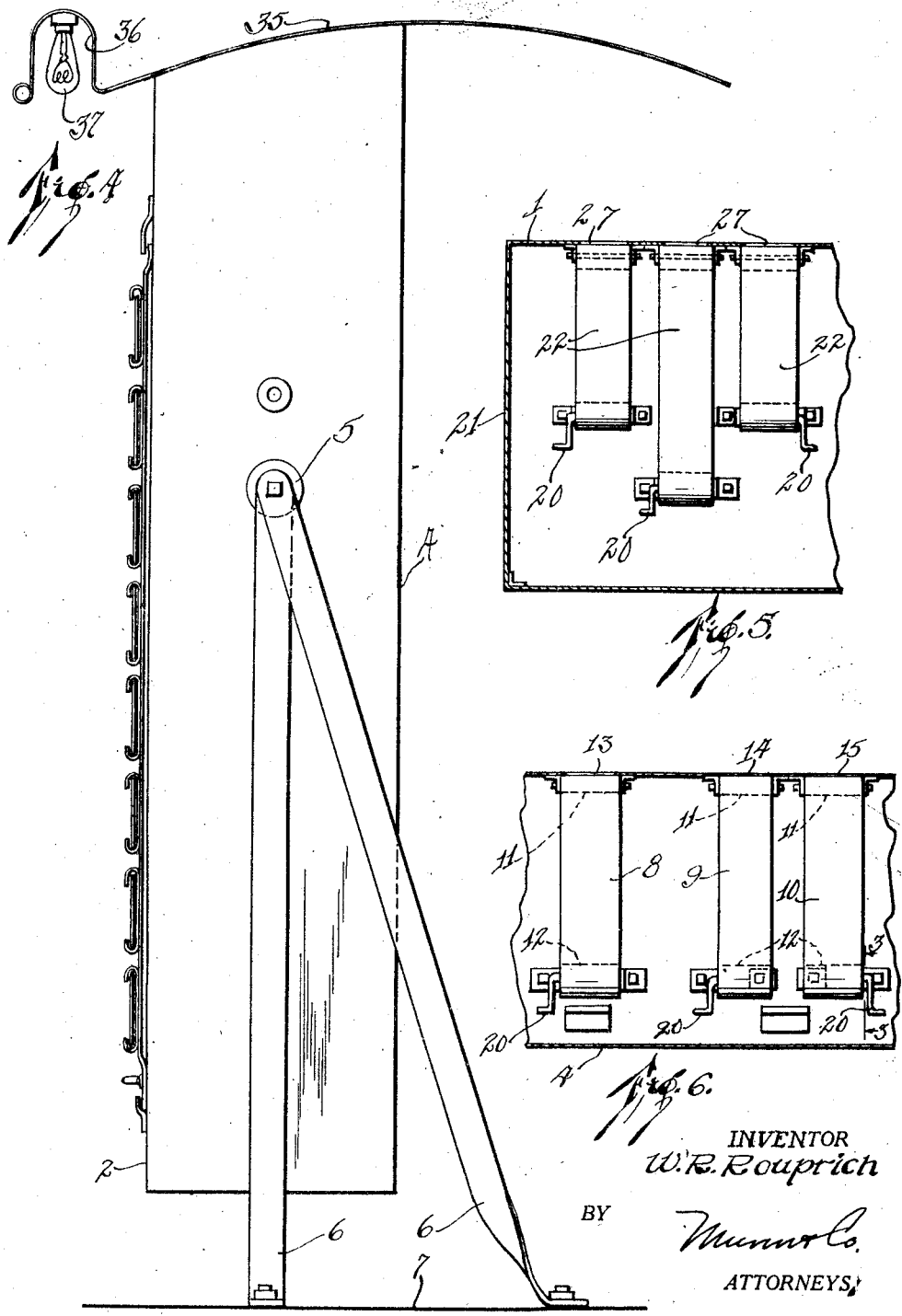
INVENTOR
W. R. Rouprich
BY
ATTORNEYS Patented Dec. 20, 1927.

1,653,312

UNITED STATES PATENT OFFICE.

WENDLE RICHARD ROUPRICH, OF McDONOGHVILLE, LOUISIANA.

INDICATOR BOARD.

Application filed May 24, 1926. Serial No. 111,332.

My invention relates to improvements in indicator boards, and it consists in the combinations, constructions, and arrangements herein described and claimed.

An object of my invention is to provide an indicator board especially adapted for dog or horse races in which novel means is provided for quickly changing the numbers on the board to accord with the changes in the betting odds as they are received, without resorting to the old way of writing down the odds with a piece of chalk on a blackboard and erasing and adding new figures as changes are required.

A further object of my invention is to provide a device of the type described which makes use of indicating boards having removable numbered cards for indicating the number of the dog or horse which is to race, and having openings disposed adjacent to the numbered cards, these openings receiving a portion of endless tapes, the tapes being preferably colored black and having white numbers thereon.

A further object of my invention is to provide a device of the type described which has novel means for actuating the tapes for bringing the desired number on the tapes into registration with the openings.

Other objects and advantages will appear in the following specification, and the novel features of the invention will be particularly pointed out in the appended claim.

My invention is illustrated in the accompanying drawings, forming part of this application, in which:

Figure 1 is a front elevation of the device,

Figure 2 is a section along the line 2—2 of Figure 1,

Figure 3 is a section along the line 3—3 of Figure 6.

Figure 4 is a section along the line 4—4 of Figure 1,

Figure 5 is a section along the line 5—5 of Figure 2, and

Figure 6 is a section along the line 6—6 of Figure 1.

The indicating boards 1, 2 and 3 are large enough to display the approximate odds on races so that the public may see the odds at any place in the grandstand or surrounding grounds. Formally the odds were posted in the betting ring on a board written with chalk. This board is about two hundred feet long, and it is therefore very difficult for patrons to read the board, unless they are gathered right around the board.

My machine is preferably to be located across the track in about the center of the grandstand, and is to have a telephone connection to the money room whereby the prices may be transmitted at once to the operator of the board as soon as the odds are determined. The boards 1 and 3 show the finished odds on the races, while the board 2 shows the approximate odds. The boards 1 and 3 further show the printed "certificates dividend" indicating how much they pay to the holders.

I will first describe the center board 2 and will then describe the boards 1 and 3. The board 2 is clearly shown in Figures 1, 3, 4 and 6. The device comprises a casing 4 having a front surface 2 representing the board 2 heretofore referred to. The casing is pivotally mounted at 5 upon supporting braces 6. The casing is supported clear of the ground 7 and may be tilted into a horizontal position during the race for permitting the spectators to view the horses or dogs running on the track.

Figure 6 shows the interior construction of the casing. It will be noted from this figure that three number-indicating tapes 8, 9 and 10 are mounted for movement upon pulleys 11 and 12. It should be noted that three of these tapes are provided for each horizontal line of openings in the board 2. I have shown eight of such lines of openings in Figure 1, and there will therefore be eight rows of tapes, one row being disposed above the other and three tapes 8, 9 and 10 disposed in each row. The tape 8 registers with an opening 13, the tape 9 with an opening 14, and the tape 10 with an opening 15. Each of these tapes has numbers thereon, ranging from 0 to 9. These numbers are preferably white on a black background.

The tapes are moved by the mechanism shown in Figure 3, and it will be clearly apparent from this mechanism that the tape 10, for example, is passed around the pulleys 12, and these pulleys are operatively connected to a gear 16 by means of gears 17. The gear 16 is keyed at 18 to a shaft 19, the shaft being provided with a crank 20, see Figure 6. A turning of the crank 20 will move the tape to bring the desired number of the tape into registration with the opening. It will at once be apparent that this method of changing numbers can be done far more quickly than can the changing of a number on a blackboard where the old number must be first erased and then the new one written on the blackboard with chalk. I have found that the numbers can be changed on the board in twenty-one seconds. This is absolutely necessary in a dog race, because the race is run in twenty-four to twenty-six seconds.

The boards 1 and 3 are similar in construction, and I will therefore describe the board 1. This device consists of a casing 21 having a front face, which I term the board 1. This face has a number of openings 27 therein, and tapes 22, similar to the tapes 8, 9 and 10, are disposed in back of each opening. These tapes are actuated by the same mechanism as shown in Figure 3, and therefore further description of this mechanism is not necessary. In Figure 2, I show the crank handles 20 as being staggered with respect to each other; that is, certain of the crank handles are disposed in front of the other crank handles, whereas in Figure 6, I show all of the crank handles as being disposed in the same line. The reason for staggering the crank handles 20 in Figure 2 is to permit the more ready operation of the tapes.

The boards 1 and 3 have their front faces printed in identically the same way, except that the board 1 is a two-dollar board, while the board 3 is a five-dollar board. The words "certificates dividend" indicated at 23 are printed on each of the boards and directly below these words are printed the words "Straight," "Place" and "Show" indicated by the numbers 24, 25 and 26, respectively. The words "Straight," "Place" and "Show" are disposed above the openings 27. Alongside of the horizontal rows of openings, I dispose channels 28 for receiving numbered cards 29.

The center board 2 is for the approximate odds, whereas the boards 1 and 3 are for the finished odds on the races. The board 2 therefore has the word "Approximates" indicated at 30 and the words "Not official" indicated at 31, printed thereon. Alongside of the openings 13, I dispose numbers indicated at 31, these numbers running from 1 to 8 inclusive. Alongside of the openings 15, I dispose channels 33 for receiving numbered cards 34.

The tops of the casings 4 and 21 are covered by curved roofs 35 and 36, respectively, for protecting the front of the boards and the interior of the casings from rain, etc. In Figure 4, I clearly show how the roof 35 is provided with a protecting hood 36 for lights 37, the lights illuminating the front of the board 2. Lights 38 are mounted in the casings 21 for permitting the operator to quickly bring the desired number into registration with the opening.

I claim:

In a device of the type described, an endless tape having numbers printed thereon, an indicator board disposed in front of said tape and having an opening therein in registration with said tape, idler pulleys positioned above and below said opening, driven pulleys positioned to the rear of said idler pulleys, said tape being disposed upon said pulleys, a shaft, a drive gear rigidly mounted upon said shaft, gears rigidly carried by said driven pulleys and in mesh with said drive gear, and means for rotating said shaft and said drive gear for rotating said driven pulleys in like directions for moving said tape upon said idler pulleys and adjacent said opening.

WENDLE RICHARD ROUPRICH.